D. M. LIVINGSTON.
NEST-EGGS.
No. 193,823.      Patented Aug. 7, 1877.
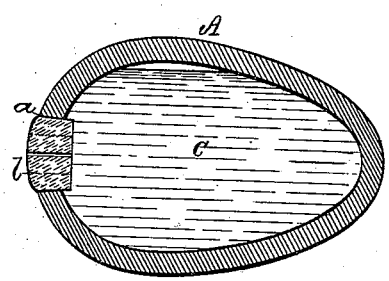
Witnesses.
Inventor
David M Livingston
by his attorney
R. H. Eddy.

UNITED STATES PATENT OFFICE.

DAVID M. LIVINGSTON, OF NEEDHAM, MASSACHUSETTS.

IMPROVEMENT IN NEST-EGGS.

Specification forming part of Letters Patent No. 193,823, dated August 7, 1877; application filed February 20, 1877.

*To all whom it may concern:*

Be it known that I, DAVID M. LIVINGSTON, of Needham, of the county of Norfolk and State of Massachusetts, have invented a new and useful Improvement in Nest-Eggs; and do hereby declare the same to be described in the following specification, and represented in the accompanying drawing, which is a longitudinal section of an egg of my improved kind.

The invention consists in an artificial egg, shell, or vessel, having the form and resemblance in color of a common hen's or other bird's egg, and porous in whole or in part, or provided with a porous stopper, and charged with a liquid or solid from which there shall emanate and pass through the pores of the said egg or those of the stopper a substance, gas, or odor destructive of or noxious to insects or creatures such as generally infest a nest or a bird while setting thereon.

My invention has been designed to destroy or drive lice from a nest, or a bird or her brood while in the nest. All breeders of poultry are aware of the difficulty of protecting setting fowls or birds from the annoyance of lice or various other insects.

In carrying out my invention I make an artificial egg, shell, or vessel, A, having the form and resemblance in color of a bird's egg, and being porous either in whole or in part. This egg may have an opening, $a$, at one end, provided with a stopper, $l$. This stopper may be porous, it forming part of the shell of the artificial egg, in which case the egg-shell need not be porous. This artificial egg-shell I charge wholly or partially with a quantity, C, of camphor, or a solution of such, or carbolic acid, or some other proper material, from which, when it is within the shell, there shall emanate and pass through the pores of such shell or the stopper a substance, gas, or odor destructive or obnoxious to lice or insects or animals such as generally infest a nest or a bird while setting thereon.

These odorous artificial eggs I have found, in practice, to be productive of excellent results, one of such serving not only the purposes of a nest-egg, but to thoroughly protect a nest or a hen while thereon from lice.

I claim—

As a new manufacture, an artificial egg or egg-shell, porous in whole or in part, or provided with a porous stopper, and charged with a liquid or solid from which there shall emanate and escape through the pores of such shell or stopper a substance, gas, or odor destructive or detrimental or obnoxious to insects or creatures such as usually infest a nest or a bird while setting thereon.

DAVID M. LIVINGSTON.

Witnesses:
R. H. EDDY,
J. R. SNOW.